Patented Apr. 8, 1952

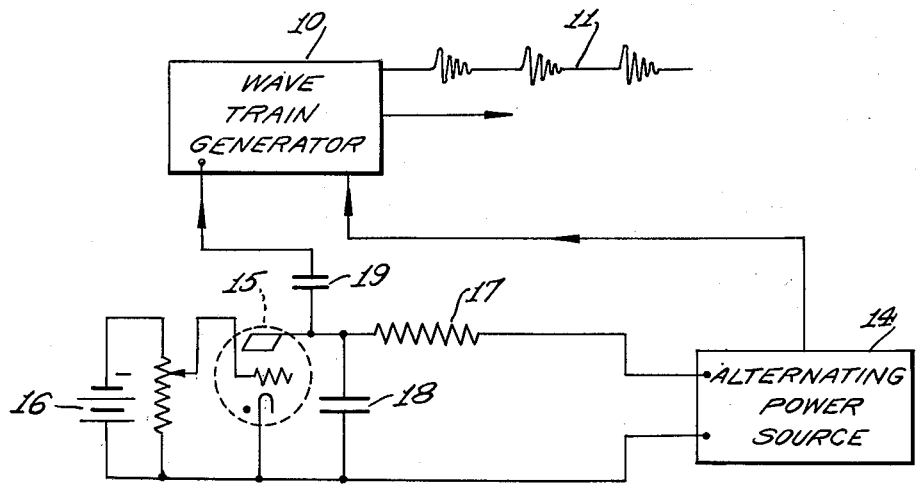
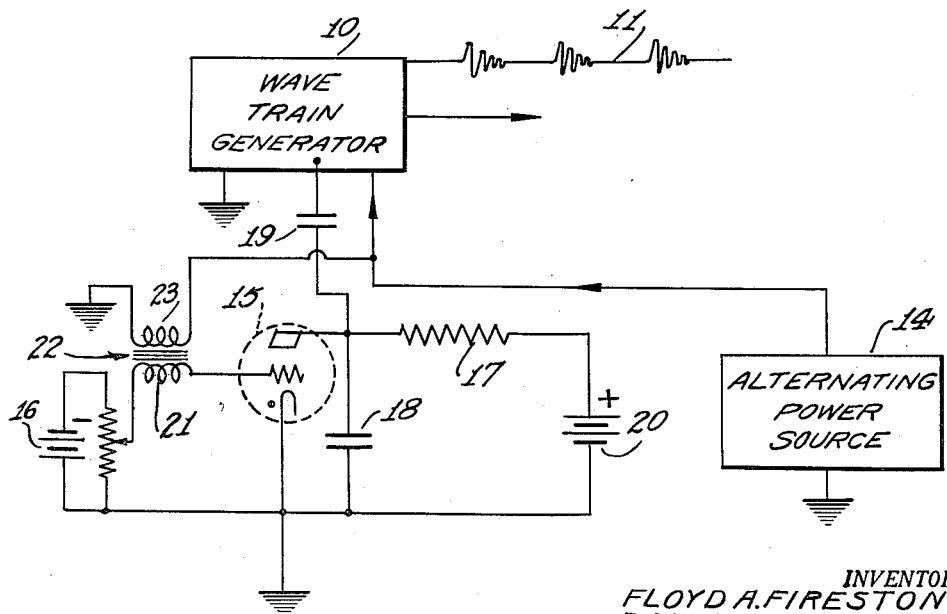

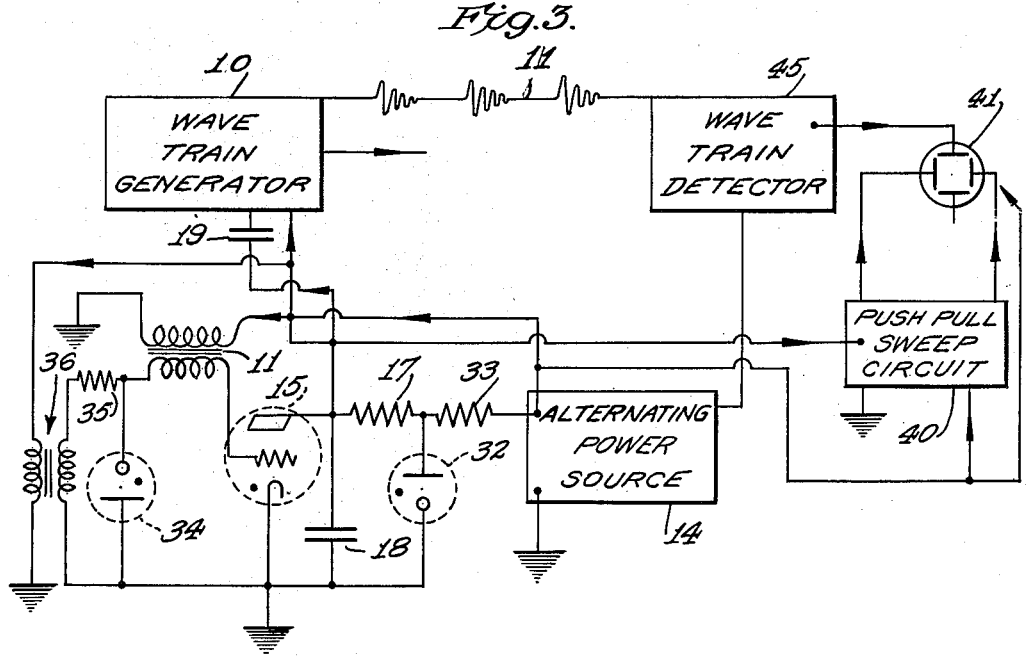
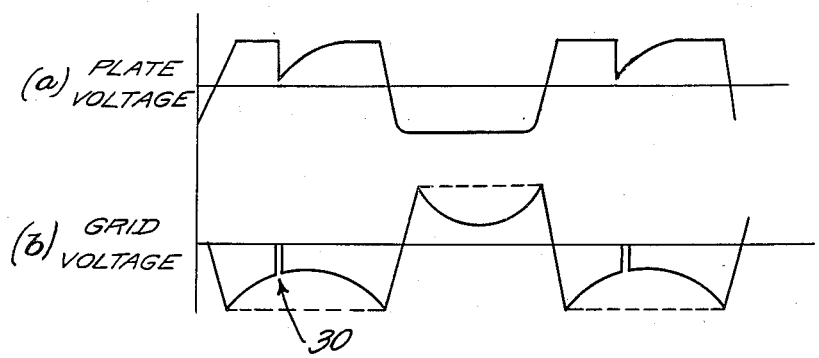

2,592,133

UNITED STATES PATENT OFFICE 2,592,133

METHOD AND MEANS FOR SYNCHRONIZING A VOLTAGE TRAIN GENERATOR AND POWER SUPPLY

Floyd A. Firestone, Ann Arbor, Mich., and Ralph B. De Lano, Jr., New York, N. Y., assignors to Sperry Products, Inc., Hoboken, N. J., a corporation of New York Application June 28, 1945, Serial No. 602,098

3 Claims. (Cl. 250—36)

This invention relates to voltage train generators which employ electronic devices, and, more particularly, to means which will enable such devices to be energized directly from a source of alternating power. One such system is disclosed in the co-pending patent application of Floyd A. Firestone, Serial No. 602,097, filed June 28, 1945, now abandoned, wherein a portion of the power cycle is utilized to render the electronic devices operative. For this purpose it is necessary to employ a synchronizer which will key the discharge of the voltage train generator in a predetermined portion of the power cycle. It is one of the principal objects of this invention to provide a novel form of synchronizer which may be employed in combination with a wave train generator and a source of alternating power to enable wave trains to be generated in synchronized relation to the power cycle.

Another object of this invention is to provide a novel form of synchronizer in a system as described above, wherein the synchronizer acts also as a voltage regulator to insure uniformity of successive voltage trains even though the effective value of successive alternations of the power source may vary.

Further objects and advantages of this invention will become apparent in the following detailed description thereof.

In the accompanying drawings,

Fig. 1 is a wiring diagram, largely in block form, showing one form of synchronizer in combination with a voltage train generator and alternating power source.

Fig. 2 is a view similar to Fig. 1, but showing another form of this invention.

Fig. 3 is a view similar to Fig. 2, but showing a modified form thereof.

Fig. 4 is a pair of graphs applicable to the form of invention disclosed in Fig. 3.

Referring to Fig. 1 there is disclosed diagrammatically a voltage train generator 10 which may be of any well-known design, containing at least one and, usually, a plurality of electron tubes, the generator being designed to generate a periodic succession of wave trains 11 when a predetermined voltage is applied to the control terminal of the generator. The wave trains may be electrical, acoustical, radio or other wave type, and a "wave train" as used herein is defined as a number of successive cycles preceded and followed by an interval of substantially no fluctuation. The local voltages, such as grid voltage, plate voltage, screen voltage, etc., are supplied in the form of alternating voltage by the alternating power source 14 which supplies as many different magnitudes and phases of voltage as are necessary for these various functions.

The use of power from the alternating current source for directly energizing the electronic devices is feasible, as disclosed in said co-pending patent application, provided the voltage train generator is rendered effective during that part of the power cycle which renders the electron tubes effective to pass current, so that the wave train is superimposed on the part of the cycle passing through the tubes. Thus, when the positive portion of the cycle is applied to the plates of the tubes, the tubes pass current and a carrier output of successive half cycles will result, and if the wave train generator is rendered effective during this half cycle, the wave train will be superimposed on each cycle of the output. For rendering the generator effective during the positive cycle of the alternating power source, a synchronizer is employed.

In Fig. 1 there is disclosed one form of such synchronizer. It may comprise a critical breakdown device such as the gas triode 15 which may be an RCA type 884 whose plate voltage may be supplied from the alternating power source 14 through a charging resistor 17 which also charges condenser 18. The grid of tube 15 is held at a constant negative potential by means of battery 16 which delivers such a negative voltage that this tube conducts no plate current until the voltage on the plate reaches a predetermined positive value. This value is one which is reached at a point somewhat below the peak of the positive half cycle of each power source alternation. Hence, at a point during the positive cycle the tube 15 suddenly conducts and discharges condenser 18, thereby transmitting a sudden impulse through condenser 19 to the control terminal of voltage generator 10. Since the electron tubes are rendered effective during the positive portion of the alternating power cycle, and since this same portion has applied an impulse on the control terminal of the generator, a wave train will be generated, superimposed on the output corresponding to the positive portion of the power cycle.

Since the positive voltage on the plate of tube 15 which renders the tube conductive is a predetermined voltage at a point below the peak of the positive portion of the power cycle, the tube will fire every time this instantaneous voltage is reached regardless of changes in the effective voltage of the power source. Therefore the voltage on the generator when it starts to radiate a wave train will be constant, so that the synchronizer serves also as a voltage regulator.

In Fig. 2 there is disclosed a modification of the Fig. 1 form of the invention. In this form, the synchronizer circuit is similar to that of Fig. 1 but the plate of tube 15 is now held at a constant positive potential by means of a battery 20 which charges condenser 18 through resistor 17. Battery 16 supplies a constant negative bias to the grid of tube 15 through a coil 21 which forms the secondary of a transformer 22 whose primary coil 23 is connected to the alternating power source 14. There is thus periodically superimposed on the grid of tube 15 an alternating voltage derived from the power source. By correctly selecting the polarity of coil 21, this superimposed voltage is of such phase as to make the grid more positive when the plates of the electron tubes in the generator 10 are being made more positive. The resulting voltage on the grid of tube 15 is as shown at 30 in Fig. 4(b) where the grid becomes sufficiently positive so that tube 15 conducts, the condenser 18 discharges, and a pulse is fed through condenser 19 to the control terminal of the voltage train generator.

Still another modification, but embodying the same principles, is disclosed in Fig. 3 in which the synchronizer circuit is similar to that of Fig. 2 except that the potential for the plate of tube 15 is derived from a voltage regulator tube 32 such as R. C. A.'s VR–105 and is steady for the period immediately preceding firing of the tube. This tube is energized by the alternating power source 14 through resistor 33. Similarly the grid bias battery 16 of Fig. 2 is replaced by voltage regulator tube 34 which receives its energy from power source 14 through transformer 36 and resistor 35, and of such phase that the grid and plate of tube 15 have opposite phases of voltage. The plate voltage and the grid voltage of tube 15 are shown in graphs (a) and (b), respectively, in Fig. 4 as a function of time. As in Fig. 2, there is periodically superimposed on the grid, the alternating voltage from the power source, and when the grid voltage changes in the positive direction sufficiently to make the tube conductive, an impulse is transmitted to the control terminal of the generator. This occurs at point 30 in graph 4(b).

As in the Fig. 1 form, the forms shown in Figs. 2 and 3 serve also as voltage regulators by causing the tube 15 to fire at a predetermined positive voltage on the grid at a point in the positive cycle of the power source below the peak, and, therefore independent of variations in the voltage of the power source. The voltages applied by the tubes 32 and 34 of Fig. 3 serve the same purpose as the batteries 20 and 16 of Fig. 2.

As shown in Fig. 4(a), the plate voltage drops nearly to zero at point 30, see Fig. 4(b), and then builds up again before the end of each cycle. The plate voltage is of modified saw-tooth form. This form may be uitlized to operate a push-pull sweep circuit 40 which produces a horizontal sweep in the cathode ray tube 41 which is adapted to indicate the output from a wave train detector 45 which receives the wave trains transmitted by the generator 12. The wave train detector and the sweep circuit may also derive the operating voltages for their electron tubes from the alternating power source 14. Thus, the generation of the wave train, the reception or detection of the wave train and the horizontal sweep of the cathode ray tube all occur during the positive portion of the power cycle.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In combination, a voltage train generator having electronic means, a source of alternating current power supply for supplying the local voltages to said means, said means being effective during a portion of each alternating current cycle, and means for actuating said generator during said portion of the alternating current cycle, said last-named means comprising a critical voltage breakdown device, said device including a plate element and a grid element, means including a voltage regulator tube for each of said elements across said alternating current supply for applying a constant voltage to each element during said portion of each cycle, and means for superimposing energy from the alternating current supply on the voltage of one of said elements, the changes in voltage in the latter element causing said device to break down when a predetermined voltage is reached.

2. In combination, a voltage train generator having electronic means, a source of alternating current power supply for supplying the local voltages to said means, said means being effective during a portion of each alternating current cycle, and means for actuating said generator during said portion of the alternating current cycle, said last-named means comprising a critical voltage breakdown device, said device including a plate element and a grid element, means including a voltage regulator tube for each of said elements across said alternating current supply for applying a constant voltage to each element during said portion of each cycle, and means for superimposing energy from the alternating current supply on the voltage of the grid element, the changes in voltage in the grid element causing said device to break down when a predetermined voltage is reached.

3. In combination, a voltage train generator having electronic means, a source of alternating current power supply for supplying the local voltages to said means, said means being effective during a portion of each alternating current cycle, and means for actuating said generator during said portion of the alternating current cycle, said last-named means comprising a critical voltage breakdown device, said device including a plate element and a grid element, means including a voltage regulator tube for each of said elements across said alternating current supply for applying a constant voltage to each element during said portion of each cycle, and means for superimposing energy from the alternating current supply on the voltage of the grid element, the changes in voltage in the grid element causing said device to break down at a predetermined point in the positive portion of the A. C. cycle.

FLOYD A. FIRESTONE.
RALPH B. DE LANO, Jr.

(References on following page)

REFERENCES CITED

The following references are of record in the file of this patent:

UNITED STATES PATENTS

| Number | Name | Date |
|---|---|---|
| 2,037,799 | Koch | Apr. 21, 1936 |
| 2,059,004 | Leeds | Oct. 27, 1936 |
| 2,098,051 | Lord | Nov. 2, 1937 |
| 2,137,351 | Schlessinger | Nov. 22, 1938 |
| 2,237,661 | Ernst | Apr. 8, 1941 |
| 2,351,439 | Livingston | June 13, 1944 |
| 2,391,894 | Gorham et al. | Jan. 1, 1946 |
| 2,394,389 | Lord | Feb. 5, 1946 |
| 2,394,891 | Bowie | Feb. 12, 1946 |
| 2,401,424 | Hershberger | June 4, 1946 |
| 2,407,272 | Hart | Sept. 10, 1946 |

FOREIGN PATENTS

| Number | Country | Date |
|---|---|---|
| 459,572 | Great Britain | Jan. 11, 1937 |
| 488,842 | Great Britain | July 14, 1938 |